Patented Feb. 16, 1932

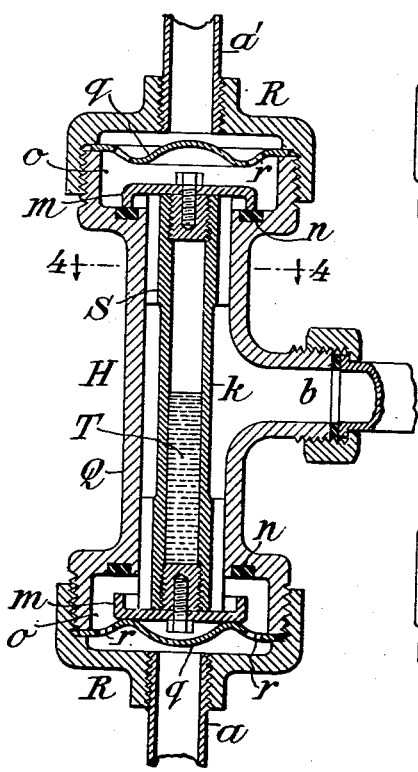
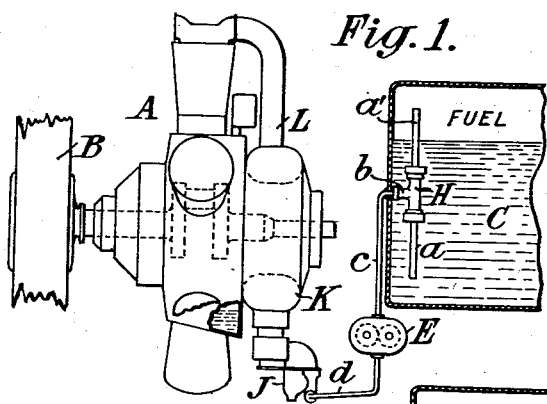
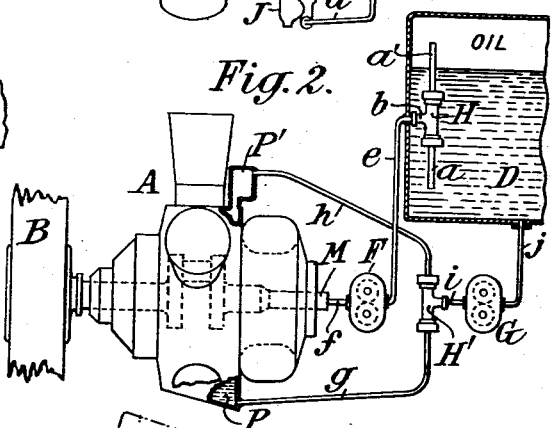
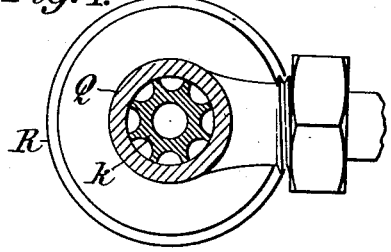
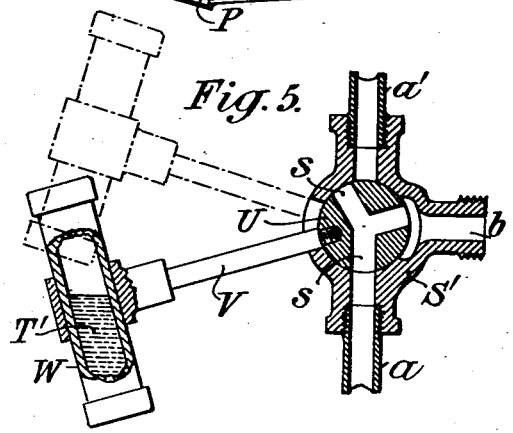

1,845,136

UNITED STATES PATENT OFFICE

WILLIAM DIETER, OF NEWARK, NEW JERSEY

AIRPLANE ENGINE

Application filed October 8, 1930. Serial No. 487,151.

This invention relates to internal combustion engines especially adapted for airplanes, and its object is to facilitate the circulation of liquids (liquid fuel and oil) to the engine when the airplane is inverted or flying upside down.

Ordinarily fuel is fed to the carburetor of airplane engines by gravity, and the lubricating oil is fed to the ducts or passages leading to the various bearings by a pump which draws it from an oil tank and delivers it to said passages, while another pump draws it from the crank-case or sump and returns it to the oil tank. On inversion the suction pipes, which ordinarily lead from the bottoms of the respective tanks, are in connection with the upper parts thereof, so that (except when the tanks are full of liquid) these pipes open above the liquid level and feed air instead of liquid. This condition is not noticeably detrimental upon merely brief inversion, as in looping; but if the pilot continues to fly inverted, the engine will fail to receive its proper supply of fuel and lubricating oil. Flying upside down is not merely an exhibition stunt, but is sometimes,—especially in war,—a desirable maneuver.

The present invention provides means whereby the engine may receive its supplies of fuel and oil in a normal manner during a prolonged inverted flight. To this end each of the liquid tanks is provided with a gravity valve and inlet pipes leading, respectively, from above and below the level in the tank to such valve, and from the valve an outlet pipe leads to a pump which delivers the liquid drawn from the tank to the engine. The valve is adapted to cut off the upper inlet pipe from the outlet and to connect the lower inlet pipe to the outlet, so that upon inversion the operation of the valve insures that the suction to the pump shall be from the lower part of the liquid in the tank and not from the air space above the liquid level.

Further features of the invention will be made apparent as the description proceeds.

In the accompanying drawings the invention is shown in its preferred embodiments as adapted to, for example, a multiple radial cylinder engine of the fixed cylinder type.

Figure 1 is a diagrammatic elevation of the engine and fuel connections, the fuel tank being shown in section;

Fig. 2 is a similar view showing the lubricating means, the oil tank being shown in section, as well as the normal sump and inversion sump of the crank-case;

Fig. 3 is a vertical mid-section of the preferred form of gravity valve;

Fig. 4 is a transverse section thereof; and

Fig. 5 is a sectional view showing a modified construction of gravity valve.

The engine A is of an ordinary and well-known type and requires no description. The particular engine shown, for simplicity, has five cylinders, but it is to be understood that any usual number and arrangement of cylinders may be employed. B is the propeller, C the fuel tank, D the oil tank, and E, F, and G pumps for feeding liquids to the engine. H is the gravity valve, which is preferably located within the tank C or D; it has two inlet pipes $a$, $a'$ and one outlet $b$ to which is connected the pipe leading to the suction of the appropriate pump.

Referring to Fig. 1: The outlet of the valve connects by a tube $c$ to the inlet of the pump E, from the delivery of which a pipe $d$ leads to any usual carburetor J, by which the fuel is supplied in usual manner to the engine. In this particular construction the fuel and air constituting the combustible mixture are introduced into an annular passage K, from which it is fed through radial pipes,—one of which is shown at L,— to the inlet valves of the engine cylinders in well-known manner. The construction shown in Fig. 1 differs from the usual construction in the introduction of the gravity valve H with its pipes $a$, $a'$ and the provision of the pump E for delivering fuel to the carburetor. This pump would be unnecessary if inverted flying were not required, but upon inversion it acts to force the fuel to a higher level to properly feed the carburetor.

Referring to Fig. 2: The outlet $b$ from the gravity valve connects by a pipe *e* to the inlet of the oil feed pump F, the discharge from which occurs through a pipe *f* into the central bore in the crank-shaft M or to any other part requiring lubrication. Ordinarily the oil, after passing through the bearings, collects in the usual sump P, from which leads a pipe *g* which connects to a gravity valve H', which may be a duplicate of the valve H. The engine is provided with an inversion sump P' which, when running inverted, receives the oil from the crank-case, and from this sump leads a pipe *h* joining the gravity valve H'. The pipes *g*, *h* enter the inlets of this valve in the same manner as do the pipes *a*, *a*' within the tanks. From the outlet of the gravity valve H' leads a pipe *i* to the suction of the pump G, from the discharge of which a pipe *j* leads back to the oil tank D. When running inverted the gravity valves H, H' insure that the oil shall be drawn through the pipe *a*', which at that time is wholly immersed in the oil, and through suction pipe *e* to the pump F and thence into the engine, while the returning oil drains from the crank-case into the inversion sump P' and is drawn through pipe *h* to gravity valve H' (its connection with pipe *g* being shut off during inversion), and thence to the pump G which pumps it back to the tank D.

The gravity valves are preferably of the construction shown in Figs. 3 and 4. In this construction the valve comprises a shell or casing Q having in communication with its middle portion an outlet neck *b* and having caps R, R fastened on its opposite ends, to which caps the inlet pipes *a*, *a*' (or, in Fig. 2, pipes *h*, *g*) are attached. Within the shell is a movable member or drop valve S, which comprises a hollow stem *k* and two tappets or disk valves *m* fastened on opposite ends of this stem and seating against valve seats *n* conveniently located, as shown, in the expanded end portions of the casing Q. The weight of the drop valve S causes it, when the engine is inverted, to fall so that its upper tappet *m* is seated and its lower tappet is separated from its seat, as shown in Fig. 3. Thus any suction exerted by the pump at the outlet *b* draws liquid through the inlet pipe *a* or *a*' (or *g*, *h*), whichever may be the lower one, into the valve chamber *o* within the expanded head of the casing Q and within the attached cap R, and then between the valve and its seat and around the stem *k* to the outlet *b* and thence to the suction of the pump. The stem is suitably guided, for which purpose it may conveniently be formed with flanges and intervening grooves, as shown in cross-section in Fig. 4. Thus, whenever the engine is inverted, the inversion of the valve acts, by the falling of the drop valve S, to close the upper seat and open the lower seat so as to shut off suction from above and establish suction from beneath.

There is some liability with any valve of this type that the tappet may adhere somewhat to its seat, and this may hold the drop valve from falling after inversion, and to avoid this it is desirable to provide the valve with means for giving it a jar or shock in the downward direction so as to jar loose the adhering tappet and cause the drop valve to fall. This is conveniently and effectively accomplished by constructing the stem *k* as a tubular stem and introducing within it a sliding weight T which is capable of moving with practical absence of friction, so that this movement shall be instantaneous upon inversion of the valve. This sliding weight is most conveniently constituted by a suitable quantity of mercury, which is shown in Fig. 3.

The valve shown in Fig. 3 is provided at each end in chamber *o* with an intercepting plate or baffle *q*, preferably of sheet metal, which in either position of the valve receives the impact of the current entering by the lower pipe *a* or *a*' and distributes this liquid laterally so that it passes through perforations *r*, *r* in preferably a circular series near the outer margin of the baffle. The purpose of this baffle plate is to prevent the upward current of liquid, by its impact on the lower tappet *m*, from lifting this tappet and closing it to its seat. In the construction shown the margins of the baffle plates are held between the valve shell Q and the screw caps R, R, so that in the case of a sufficiently soft or yielding metal this serves also the function of a gasket to make a tight joint.

A modified construction of valve is shown in Fig. 5. Here the valve is of the rotary three-way type, comprising a turn plug U turning freely in the valve shell S' and fastened to an arm V carrying a weight W. The casing has inlets receiving the respective pipes *a*, *a*' and an outlet *b*, as in the previous construction. The ports *s* in the valve plug are shaped with reference to those in the casing, so that communication is always maintained with the outlet *b* and with the lowermost inlet pipe *a* or *a*', as the case may be. Upon inversion the parts fall to the position indicated in dotted lines. The weight W may desirably be provided with a minor or auxiliary weight having the function of the mercury T in the first construction described, and it is preferable in this case to make the weight W tubular and to place within it a suitable quantity of mercury, as indicated at T'. Any other kind of auxiliary weight may be substituted for the mercury in either construction.

The liquid pumps E, F, and G are shown diagrammatically as gear pumps, such as are commonly used for lubricating internal combustion engines. These pumps are commonly made with a yielding bypass valve to limit the pressure and bypass any excess of liquid. A suitable construction of such gear pumps with bypass valves is contained in the pending application of Alfred H. R. Fedden, Serial No. 380,585, filed July 24, 1929.

The invention is not limited to the precise constructions shown, which are to be treated as examples and which may be varied in accordance with the judgment and skill of the engineer or designer to adapt the valve to any special conditions.

This invention is to be distinguished from those constructions used in airplanes wherein the fuel tank is provided with two outlet pipes leading from its opposite bottom ends to a gravity valve adapted, upon the serious upward or downward tilting of the airplane in landing or diving, to close the outlet from the upper end which is liable, if the fuel runs low, to be left uncovered, whereby to avoid drawing in air from the upper outlet and insure the drawing of fuel through the lower outlet. Such constructions are adapted to serve their intended purpose, but are not operative if the airplane is inverted so as to fly upside down. For the latter purpose it has been proposed to construct the fuel tank with an outlet pipe which has a swiveled mounting within the tank and is weighted so as to cause its lower or induction end to gravitate to the lowest part of the tank, only a single outlet being provided with no valve. The present invention provides for the requirements of inverted flight in a simple and practical manner by the provision of separate outlets for use in normal and inverted flight and a simple gravity valve to control the flow.

I claim as my invention:

1. An airplane engine adapted for inversion, comprising a liquid tank, a gravity valve, inlet pipes leading respectively from the top and bottom of said tank to said valve, a pump, and an outlet pipe from the valve to said pump, said valve being adapted to cut off the upper inlet pipe and connect the lower inlet pipe to the outlet pipe, whereby the pump draws liquid from the lower side of the tank and is cut off from the upper side, and whereby this condition is reversed upon inversion of the airplane.

2. The subject-matter of claim 1, with an auxiliary weight freely movable and adapted on inversion to fall in advance of the movement of the gravity valve and to impart a starting impulse thereto.

3. The subject-matter of claim 1, with an auxiliary weight comprising a mass of mercury freely movable in a tube connected to the gravity valve, and adapted on inversion to fall in advance of the movement of the gravity valve and to impart a starting impulse thereto.

4. The combination with an airplane engine of a gravity valve comprising a casing having a middle outlet and upper and lower inlets, with seats between said inlets and outlet; a movable gravity member including a tubular stem and tappets above the upper seat and below the lower seat, connected together through said stem, and a mass of mercury enclosed in said tubular stem, free to gravitate to the bottom thereof on inversion.

5. The combination with an airplane engine of a gravity valve comprising a casing having a middle outlet and upper and lower inlets, said casing having seats at its opposite ends and a movable gravity member including a stem and tappets above the upper seat and below the lower seat connected together through said stem, and baffle plates located between the respective inlets and the tappets to intercept the entering current from the lower tappet.

6. The construction of claim 5 further characterized in that the baffle plates have orifices near their margins through which the entering current flows around the lower tappet.

7. The construction of claim 5 further characterized in that the casing has caps fastened upon its opposite ends through which the respective inlets enter and the baffle plates confined between the ends of the casing and said caps.

In witness whereof, I have hereunto signed my name.

WILLIAM DIETER.